United States Patent
Koenig et al.

[15] 3,653,937
[45] Apr. 4, 1972

[54] ALUMINA TRIHYDRATE PIGMENT AND PROCESS FOR THE PREPARATION THEREOF

[72] Inventors: James J. Koenig, Belleville, Ill.; Leroy D. Hart, St. Louis, Mo.

[73] Assignee: Aluminum Company of America, Pittsburgh, Pa.

[22] Filed: Aug. 11, 1969

[21] Appl. No.: 849,081

[52] U.S. Cl.................................................106/288 B, 23/141
[51] Int. Cl............................................C09c 1/40, C01f 7/02
[58] Field of Search..................23/141, 142, 143; 106/288 B

[56] References Cited

UNITED STATES PATENTS

| | | | |
|---|---|---|---|
| 2,549,549 | 4/1951 | Wall | 23/143 |
| 3,055,737 | 9/1962 | Wilson, Jr. et al. | 23/143 |
| 3,223,482 | 12/1965 | Puddington et al. | 23/141 |
| 3,337,305 | 8/1967 | Byrns | 23/143 |
| 1,958,710 | 5/1934 | Moyer | 74/524 |
| 2,406,420 | 8/1946 | Weiser et al. | 252/465 |
| 1,953,201 | 4/1934 | Tosterud | 23/143 |
| 3,268,295 | 8/1966 | Armbrust et al. | 23/141 |
| 3,385,663 | 5/1968 | Hughes | 23/143 |
| 3,408,160 | 10/1968 | Schmidt et al. | 23/143 |

Primary Examiner—Oscar R. Vertiz
Assistant Examiner—H. S. Miller
Attorney—Abram W. Hatcher

[57] ABSTRACT

Alumina trihydrate of an average particle size of less than about 0.7 micron and a dispersibility in water of at least about 70 percent by weight. The trihydrate is prepared by heating a slurry containing a mix of alumina hydrate of a particle size of less than 0.7 micron and an alkaline solution at 150°–220° F for from 5 to 45 minutes, separating the resulting alumina trihydrate from the slurry, dispersing it with the aid of a dispersing agent, and then drying it.

8 Claims, 1 Drawing Figure

Patented April 4, 1972 3,653,937
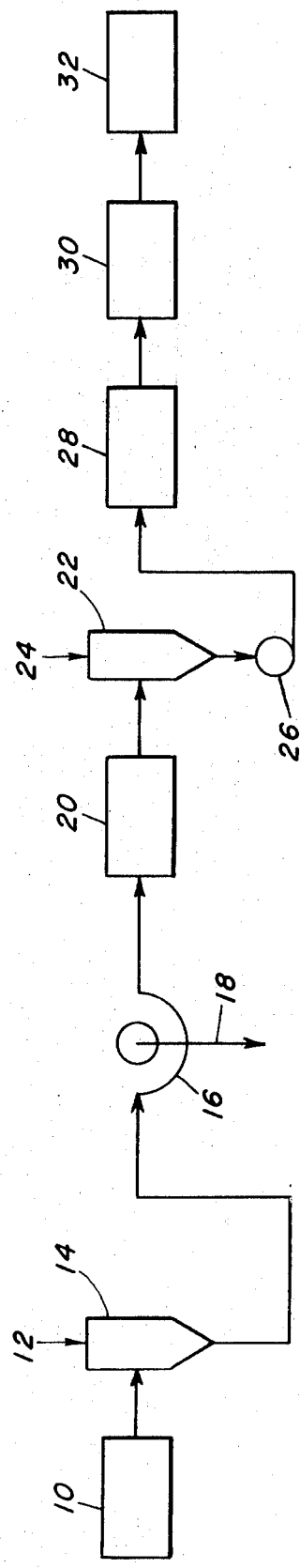
INVENTORS.
JAMES J. KOENIG &
LEROY D. HART
By Abram W. Hatcher
Attorney

3,653,937

ALUMINA TRIHYDRATE PIGMENT AND PROCESS FOR THE PREPARATION THEREOF

BACKGROUND OF THE INVENTION

This invention relates to an alumina trihydrate of improved rheological properties in water. More particularly, it relates to a process for production of a new alumina trihydrate pigment of sub-micron particle size from which fluid dispersions may be prepared at 70 percent solids or more by weight and which remain fluid upon aging.

Aqueous dispersions of alumina trihydrate are used in the preparation of paper coatings, paints, ink, ceramic slips, and the like. These products sometimes must be stored for long periods of time before use, and it is important that their viscosity remain stable during storage. Also, it is often desired that these products be prepared at as high a percent solids as possible for the sake of economy and efficient use. Paper coatings for application by trailing blade, for example, are prepared in the 60–65 percent solids by weight range, and this requires the use of pigment dispersions which are fluid at 70 percent solids or more. Pigments such as titanium dioxide, kaolin clay, and calcium carbonate, which are widely used in the preparation of products of this nature, may be processed by those skilled in the art to obtain dispersions which are fluid at 70 percent solids or more and which have satisfactory stability on aging. Also, the dispersibility of known alumina trihydrate pigments of an average particle size of greater than 0.7 micron has been sufficient to satisfy most commercial requirements. However, in general, alumina trihydrate pigments having an average particle size of less than 0.7 micron, have not been able to meet such requirements. As a result use of such pigments to date has been restricted. The use of alumina trihydrate pigments of a particle size of less than about 0.7 micron has been further restricted because aqueous dispersions thereof are normally fluid at not more than 50 percent solids by weight, and even then the viscosity of the dispersions tends to increase rapidly upon aging. Therefore, development of an alumina trihydrate of this desired average particle size of less than about 0.7 micron which is also dispersible in water to a fluid-stable condition at a 70 percent by weight or greater solids concentration represents a highly desirable result.

SUMMARY OF THE INVENTION

It is accordingly one object of this invention to provide an alumina trihydrate of sub-micron particle size from which fluid dispersions of prolonged stability may be prepared at 70 percent or higher solids concentrations by weight. Another object is to provide a process for production of a sub-micron alumina trihydrate pigment from which high solids content aqueous dispersions may be prepared and which remain stable upon aging for lengthy periods.

In its broader aspects our invention involves an alumina trihydrate pigment of an average particle size of less than about 0.7 micron and a dispersibility in water of at least about 70 percent solids by weight. This product is prepared by mixing alumina hydrate of an average particle size of less than about 0.7 micron and an alkaline or caustic solution, for example, one containing sodium or potassium hydroxide or carbonate or aluminate or mixtures thereof, heating the resultant slurry at about 150°–220° F. for from about 5 to about 45 minutes, separating resulting alumina trihydrate from the solution, dispersing the trihydrate with the aid of a dispersing agent and drying it. When we refer to "percent solids by weight" or "solids content," we mean that the alumina trihydrate represents all of the total solids except not more than that 1.0 percent by weight other materials such as dispersants, stabilizers, and the like.

The starting alumina hydrate having the required average particle size of less than about 0.7 micron may be prepared, for example, by the well-known Bayer process, that is, by seeding or precipitation by carbonation from a sodium aluminate solution obtained by caustic digestion of bauxite. The starting alumina hydrate differs from the alumina trihydrate product of this invention in that it is not dispersible in water to the 70 percent solids concentration and in that it is not necessarily made up of essentially alumina trihydrate, as it may also contain some alumina monohydrate.

According to one embodiment of our invention the alumina trihydrate is separated from the solution by filtering, for example, by a rotary vacuum filter. According to another embodiment it is separated by centrifugation. Regardless, however, of the type of separation used, dispersion of the alumina trihydrate product before drying is aided according to the invention by use of a dispersant or dispersing agent.

Representative dispersing agents or dispersants which may be used according to the invention include ammonium salts of amido-polyphosphates such as the trademarked product Victamide, anionic polyelectrolyte water-soluble polymers known by the trademarks Nopcosant L and Tamol 850, and mixtures of two or more of these or like dispersants.

The minimum time for heating the aqueous alkaline slurry of alumina hydrate at 150°–220° F to produce the alumina trihydrate of improved dispersibility and particle size of less than about 0.7 micron is at least about 5 minutes.

According to another embodiment of our invention the filter cake or centrifuge cake produced during separation of the alumina trihydrate product by filtration or centrifugation is washed prior to drying until the concentration of soluble salts expressed as $Na_2O$ does not exceed 0.2 percent by weight of the alumina trihydrate.

According to a still further embodiment of my invention the drying step in producing the alumina trihydrate of improved dispersibility is performed by spray drying. Other conventional methods of drying, however, may be used, including pan drying, furnace drying, tunnel drying, kiln drying and the like.

We have found that according to our invention an aqueous dispersion prepared from our alumina trihydrate product is stable in fluid form, that is, fluid-stable, for 30 days or longer.

BRIEF DESCRIPTION OF THE DRAWING

For a better understanding of our invention, reference will now be made to the drawing, which is a schematic representation in flow-sheet form of a representative way in which the alumina trihydrate of this invention may be prepared. In the drawing, an alkaline slurry of alumina hydrate is heated by steam 12 at 14 at a temperature of 200° F. and then conducted to a filter, for example, a rotary vacuum filter 16, from which filtrate exits at 18. The heating treatment may be by steam injecting coils in a tank or by passing the slurry through a heat exchanger. After heating, the slurry may, if desired, be cooled by a separate heat exchanger, for example, to about 150° F. prior to being filtered. The washed filter cake 20 is then dispersed in water at 22 with the aid of a dispersant or dispersants introduced at 24 and the resulting dispersion conducted by pump 26 to a drier 28 where it is dried, for example, by spray drying, to a substantially dry (less than 1 percent moisture) alumina trihydrate product 30, which is packaged at 32.

DESCRIPTION OF PREFERRED EMBODIMENT

The following examples are illustrative of my invention. In these examples, the alumina hydrate used as the starting material in preparation of the alumina trihydrate pigment of this invention had an average particle size of about 0.3 micron as determined by an electron microscope on a weight basis. The starting alumina hydrate was precipitated from a sodium aluminate solution obtained by the Bayer process at 90° F. Precipitation may be according to the teaching of U.S. Pat. No. 2,549,549. Example I is illustrative of preparation of alumina trihydrate according to the present invention. Examples II–IV, inclusive, illustrate prior art and other procedures which are not successful in obtaining an alumina trihydrate which has the surprising 70 percent or higher dispersibility of the present invention.

EXAMPLE I

A 50 grams per liter solids slurry of alumina trihydrate having a total caustic (expressed as $Na_2CO_3$) concentration of 0.4 gram per liter was heated to 200° F. and held at that temperature for thirty minutes before filtration on a rotary vacuum filter. The filter cake was dispersed with a mixture of 0.4 percent Victamide and 0.1 percent Nopcosant L based on the weight of the 0.3 micron alumina trihydrate pigment. The dispersion was spray dried. A 71 percent solids dispersion of the spray-dried alumina trihydrate pigment product was prepared with a Model LB–101 Kinetic Dispersion Corporation Laboratory Mill. An additional 0.4 percent by weight Victamide was supplied during the preparation of the 71 percent solids dispersion to obtain a greater degree of fluidity. The apparent viscosity of the 71 percent solids dispersion, as measured by a Brookfield Model LVF Viscometer was 775 centipoises at 6 r.p.m. The viscosity of this dispersion did not increase after 3 months of aging.

EXAMPLE II

A portion of the same slurry of 0.3 micron alumina trihydrate was not heated but was filtered at 130° F., tunnel dried and pulverized. A 775 centipoise (6 r.p.m.) dispersion of this pigment could be prepared at only 55 percent solids with 0.9 percent by weight Victamide or Nopcosant L dispersants. The dispersion made with Victamide thickened to a viscosity of 100,000 centipoises (6 r.p.m.) after aging for 24 hours. The dispersion prepared with Nopcosant L did not thicken on aging but was fluid at only about 55 percent solids.

EXAMPLE III

A 50 grams per liter solids slurry having a total caustic concentration of 0.6 gram per liter was heated to 200° F. and held at that temperature for 30 minutes before filtration on a rotary vacuum filter. No dispersants were added to the filter cake before drying the filter cake at 230° F. The dried cake was pulverized and an aqueous dispersion prepared using 1.0 percent Victamide on the weight of the alumina trihydrate. A fluid dispersion could be prepared at not over about 63 percent solids. The slurry thickened to a paste-like consistency after aging for 3 days at room temperature.

EXAMPLE IV

A 50 grams per liter solids slurry having a total caustic concentration of 0.6 gram per liter and a temperature of 130° F was filtered on a rotary vacuum filter and the filter cake washed with 160° F water on the filter to the extent that the filter cake analyzed 0.07 percent soluble $Na_2O$ based on the weight of the alumina trihydrate. The washed cake was pan dried at 230° F. The dried product was pulverized and an aqueous dispersion prepared using 1.1 percent Victamide based on the weight of the alumina trihydrate. A fluid dispersion could be prepared at not over about 57 percent solids. The fluid dispersion thickened to a paste-like consistency after aging for 24 hours at room temperature.

While the invention has been described in terms of preferred embodiments, the claims appended hereto are intended to encompass all embodiments which fall within the spirit of the invention.

Having thus described our invention and certain preferred embodiments thereof, we claim:

1. A process for preparation of an improved alumina trihydrate which comprises mixing alumina hydrate of an average particle size of less than about 0.7 micron and an alkaline solution, heating the resultant slurry at a temperature of from about 150° to about 220° F. for a period of from about 5 to about 45 minutes, separating the resultant alumina trihydrate from the solution, dispersing the alumina trihydrate in water with the aid of a dispersant selected from the group consisting of ammonium salts of amido-polyphosphates, anionic polyelectrolyte water-soluble polymers and mixtures thereof, and thereafter drying the alumina trihydrate, thereby obtaining alumina trihydrate of an average particle size of less than about 0.7 micron and a dispersibility in water with the aid of dispersant of at least about 70 percent by weight.

2. The process of claim 1 wherein the alumina trihydrate is separated from the solution by filtration.

3. The process of claim 1 wherein the alumina trihydrate is separated from the solution by centrifugation.

4. The process of claim 1 wherein the alumina trihydrate separated from the solution is treated in cake form by the dispersing agent.

5. The process of claim 1 wherein the alumina trihydrate obtained is dried by spray drying.

6. The process of claim 1 wherein the fluid stability of a dispersion prepared from the alumina trihydrate obtained is at least 30 days.

7. The process of claim 1 wherein prior to being dispersed with the aid of a dispersant, the alumina trihydrate separated from the solution is washed until the concentration of soluble salts therein expressed as $Na_2O$ is not greater than 0.2 percent by weight of the alumina trihydrate.

8. The product obtained by the process of claim 1.

* * * * *